(12) United States Patent
Poynton

(10) Patent No.: US 6,843,323 B2
(45) Date of Patent: *Jan. 18, 2005

(54) SHOE AND SHOEING METHOD

(75) Inventor: Andrew Paul Poynton, 60 High Street, Malmesbury, Wiltshire, SN16 9AT (GB)

(73) Assignee: Andrew Paul Poynton, Malmesbury (GB)

( * ) Notice: Subject to any disclaimer, the term of this patent is extended or adjusted under 35 U.S.C. 154(b) by 0 days.

This patent is subject to a terminal disclaimer.

(21) Appl. No.: 10/808,102

(22) Filed: Mar. 24, 2004

(65) Prior Publication Data

US 2004/0194973 A1 Oct. 7, 2004

Related U.S. Application Data

(63) Continuation of application No. 10/182,548, filed as application No. PCT/GB01/00433 on Feb. 1, 2001, now Pat. No. 6,732,807.

(30) Foreign Application Priority Data

Feb. 1, 2000 (GB) .............................................. 0002293
Jun. 16, 2000 (GB) .............................................. 0014818

(51) Int. Cl.[7] .............................. A01L 3/00; A01L 7/02
(52) U.S. Cl. ............................................. 168/4; 168/12
(58) Field of Search ................................ 168/4, 12, 24, 168/29, 22, DIG. 1, DIG. 2

(56) References Cited

U.S. PATENT DOCUMENTS

| 764,488 | A | 7/1904 | McCain |
| 964,438 | A | 7/1910 | Lazarus |
| 1,629,083 | A | 5/1927 | Meade |
| 3,118,449 | A | 1/1964 | Bane |
| 3,494,422 | A | 2/1970 | Clark |
| 3,519,079 | A | 7/1970 | Bieber |
| 3,630,289 | A | 12/1971 | Norberg |
| 3,967,683 | A | 7/1976 | Ensinozo |

(List continued on next page.)

FOREIGN PATENT DOCUMENTS

| DE | 26 56 348 A1 | 12/1976 |
| DE | 197 32 269 A1 | 2/1999 |
| EP | 0 651 943 A1 | 9/1994 |
| EP | 0 823 209 A2 | 2/1998 |
| EP | 0 832 560 A1 | 4/1998 |
| EP | 0 860 115 A1 | 8/1998 |
| EP | 0 893 057 A1 | 1/1999 |
| GB | 2 334 424 A | 8/1999 |
| NZ | 184321 | 5/1981 |
| NZ | 221274 | 1/1987 |
| WO | WO 94/06285 A1 | 3/1994 |
| WO | WO 94/12024 A1 | 6/1994 |
| WO | WO 94/22296 A1 | 10/1994 |
| WO | WO 95/22252 A1 | 8/1995 |
| WO | WO 96/01044 A1 | 1/1996 |
| WO | WO 98/24312 A1 | 6/1998 |
| WO | WO 99/15006 A1 | 4/1999 |
| WO | WO 99/40782 A1 | 8/1999 |
| WO | WO 99/65298 A1 | 12/1999 |
| WO | WO 03/000049 A1 | 1/2003 |

OTHER PUBLICATIONS

Tone® P–300 and P–700 High Molecular Weight Caprolactone Polymers (1988 Product Literature of Union Carbide Corporation). 17 pages.
Tone® Polymer P–767(1988 Product Literature of Union Carbide Corporation). 4 pages.

Primary Examiner—Teri P. Luu
Assistant Examiner—Elizabeth Shaw
(74) Attorney, Agent, or Firm—Senniger Powers

(57) ABSTRACT

A shoe for a hoofed animal, e.g. a horseshoe, is described which comprises a body made from a thermoplastic composition which comprises a matrix of a thermoplastic material which has a softening point of less than 100° C., such as a polycaprolactone. A method of shoeing a hoofed animal, such as a horse, is also described.

25 Claims, 5 Drawing Sheets

U.S. PATENT DOCUMENTS

| | | |
|---|---|---|
| 4,265,314 A | 5/1981 | Tovim |
| 4,346,762 A | 8/1982 | Tovim |
| 4,892,150 A | 1/1990 | Thoman |
| 4,896,727 A | 1/1990 | Busser |
| 5,011,407 A | 4/1991 | Pelerin |
| 5,026,278 A | 6/1991 | Oxman et al. |
| 5,040,976 A | 8/1991 | Ubel, III et al. |
| 5,066,231 A | 11/1991 | Oxman et al. |
| 5,069,289 A | 12/1991 | Schaffer |
| 5,129,461 A | 7/1992 | Igrow |
| 5,199,498 A | 4/1993 | Knudson |
| 5,203,415 A | 4/1993 | Schaffer |
| 5,681,350 A | 10/1997 | Stovall |
| 5,706,898 A | 1/1998 | Beadle |
| 6,401,828 B1 | 6/2002 | Rafeld |
| 6,732,807 B2 * | 5/2004 | Poynton ............ 168/4 |

* cited by examiner

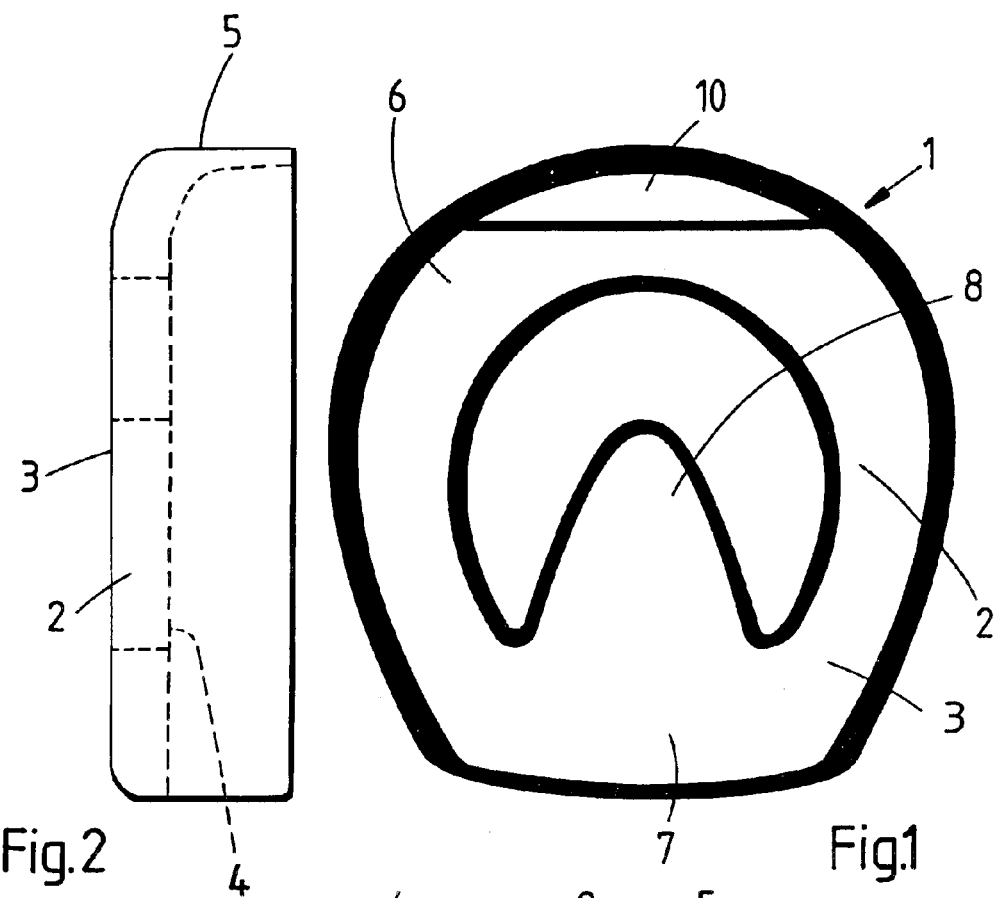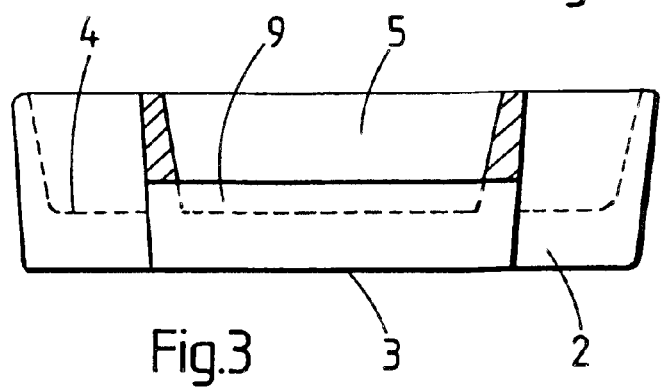

SHOE AND SHOEING METHOD

CROSS-REFERENCE TO RELATED APPLICATIONS

This is a continuation of U.S. application Ser. No. 10/182,548, which has a filing date of Jul. 30, 2002 now U.S. Pat. No. 6,732,807 and is the National Stage of International application number PCT/GB01/00433, filed Feb. 1, 2001.

BACKGROUND OF INVENTION

The present invention relates to a shoe for a hoofed animal, such as a horseshoe, and to a method for shoeing a hoofed animal, such as a horse.

The hoof on the foot of a horse comprises a curved covering of horn which protects the front of, and partially encloses, the end of the corresponding digit of the horse. It thus corresponds to a nail on a finger or toe of a human being. The forward end of the hoof is known as the toe, from which the side walls of the hoof extend rearwardly to a heel on either side of the horse's foot. The hoof surrounds a body of tissue which surrounds the digit itself so as to form a capsule, the underside of which forms the sole. Between the hoof and this body of tissue there is an intermediate layer of tissue called the white line. At the rearward end of the horse's foot there is an elastic horny pad of generally triangular shape which is known as the frog.

Domesticated horses are normally shod with horseshoes. A horseshoe is usually attached by nailing to the underside of the hoof to protect it from damage. Conventional horseshoes for horses with healthy feet are made from metal, such as cast iron, steel, or an aluminium alloy. One common design of horseshoe is generally arcuate in shape and sized so as to conform to the size of the hoof to be shod. The size and weight of the horseshoe is normally determined by the type of horse being shod. For example, a working horse will be fitted with heavier shoes than a racehorse. In some designs there may be an upstanding tab at the front of the shoe, or a pair of upstanding tabs positioned one to each side of the front of the shoe, designed to assist in locating the shoe on the hoof and to provide additional protection for the toe of the horse's foot. Other designs of metal horseshoe are known, for example, so-called egg, straight and heart-bar shoes; these are often recommended for use on horses with hoof or lameness problems.

The traditional way of making horseshoes is for the farrier to forge them from bars of iron which are heated on an open hearth forge, hammered to shape on an anvil, and pierced to provide holes for the horseshoe nails. A farrier can produce shoes in advance for fitting to a horse with healthy feet which he has shod previously and whose hoof measurements he already knows. Alternatively he can purchase factory made shoes which can in suitable cases be fitted as received to a horse with healthy feet or which may require to be modified somewhat in shape, or in the position or direction of the holes for the horseshoe nails, using a forge and anvil. Often the horse will be brought to the farrier's smithy to be shoed but many horses are shod at their owner's premises, in which case the farrier will normally bring a portable forge with him in case of need.

Plastics and rubber horseshoes are also known in the art, particularly for shoeing horses suffering from hoof problems. For example, rubber shoes made from a shock-absorbing rubber bonded to a steel or aluminium core are available on the market, as are also horseshoes made from polyurethane and from plastics moulded on to an aluminium core. Some of these mimic the form of the conventional metal shoes and, likewise, are attached to the hoof by nails. Another type of currently available horseshoe is sold in kit form, using polyurethane base plates that have to be cut to the shape of the horse's hoof. Plastics tags are then welded at intervals to the outer rim of the base in an upwardly and radially inward fashion. The shoes are then attached to the hoof by cementing the plastic tags to the outer wall of the hoof. Plastics horseshoes have a number of advantages over metal shoes; for example, they are lighter and can be affixed to a horse's hoof by glueing instead of nailing. Thus they are beneficial for use when a horse is suffering foot problems because they obviate the use of nails. Such foot problems may include laminitis, white line disease (or fungal onychomycosis), navicular disease, sand cracks, or weak heels. Laminitis is a painful condition in which the hoof becomes partly detached from the rest of the hoof capsule along the white line. This can be accompanied by splitting of the hoof. Driving a nail into a hoof in such a condition can exacerbate the problem besides being painful for the horse.

In order to treat an injury to or a disease of a horse's foot, it is usual to cut or abrade away the affected material. Since the pathogens which attack the hoof are generally anaerobic, this helps to speed up a cure. However, there is then the problem of providing support to the trimmed hoof so that the horse can still put weight on its foot without undue discomfort and without exacerbating any misalignment of the horse's leg or, in particular, of the digital bone of the foot, due to the lameness condition from which the horse is suffering. This support can be provided by use of a therapeutic shoe and by using a hoof replacement material to replace the parts that have been cut or abraded away. If the farrier elects to fit a metal shoe then he may have to undertake considerable work to forge a horseshoe of the appropriate shape. If he decides to opt for a plastics or rubber shoe then he may have to cut the shoe to shape or use chemicals with undesirable side effects in order to provide a replacement for the hoof material and any tissue that has been cut or abraded away. If the farrier decides that the horse's foot needs realignment he may decide to provide the horseshoe with a lateral, medial, anterior or posterior extension. This is difficult to effect with a preformed horseshoe.

Foals are sometimes born with deformities such as weak flexor tendons, or club foot syndrome, or may require treatment to correct toe in or toe out conformation. In such instances the farrier will often fit the foal with corrective shoes. One type of foal corrective shoe is formed entirely from a heavy duty plastics material with an upstanding outer cuff which is glued or cemented to the hoof wall. Such shoes can be provided with an appropriate wedge shape and/or with an appropriate lateral, medial, anterior or posterior extension to correct the condition being treated. It has also been proposed to use therapeutic cuffs which can be glued or cemented to the outer wall of the hoof after an appropriate metal shoe has been rivetted to it or to which a shoe can be carefully nailed.

In some cases the farrier may choose to put a pad of leather or of an elastomeric material between the hoof and the horseshoe.

European Patent Specification No. 0 893 057 A1 discloses an open plastic horseshoe with holes for nails and having a bridge piece positioned on one arm for adjustment of the distance between the two arms of the horseshoe.

Use for shoeing a horse of a preformed strip of L-section adhered to a lower wall of its hoof and then adhering a plastics horseshoe thereto is proposed in New Zealand Patent Specification No. 184321.

A horseshoe adhered to a hoof is described in New Zealand Patent Specification No. 221274.

In German Patent Specification No. 19732269 there is taught a horseshoe with an outer hoof cover used as the walking surface which is secured to the hoof by at least two elements. A contact strip binding forms an intermediate layer between the hoof surface and the outer hoof protection. The hoof protection can be made from a thermoplastic material, such as polyester, or vinyl ester, or from an elastomer or a metal.

International Patent Publication No. WO99/15006 describes a helical stock from which circumferential lengths can be cut to be used as horseshoes, the stock comprising a helical coil of plastics material wound about an axis such that the cross section of the coil in a plane containing the axis is constant in shape for any such plane and substantially corresponds to the cross section of a horseshoe in the same plane.

British Patent Specification No. 2334424 teaches a horseshoe having a metal core with a polyurethane coating.

U.S. Pat. Specification No. 5,199,498 proposes a custom horseshoe pad comprising a polymer composition containing at least about 50% by weight of high molecular caprolactone polymers wherein the composition has a melting point of from about 120° F. to about 200° F. (about 48.9° C. to about 93.3° C.). The molecular weight of the caprolactone polymers can range, for example, from about 35,000 to about 60,000. The pad covers areas of the horse's foot that are sensitive and vulnerable to disease and damage. The horseshoe pad is positioned between a horseshoe and the hoof and is intended to expand the overall protection afforded by the standard horseshoe without obviating the need for the shoe.

In U.S. Pat. Specification No. 5,681,350 there is described a rigid and permeable prosthesis that fills the debrided portion of the wall of a horse's hoof having white line disease or the like. This prosthesis includes a mass of particulate material with individual particles coated with a resin so as to cleave to one another at all contact areas and transfer weight, while leaving interconnected pore spaces that allow air and liquid medications to reach the diseased area during the healing process.

International Patent Publication No. WO 94/06285 proposes a lightweight plastic horseshoe which is held to the bottom of a horse's hoof by gluing it thereto and by additionally providing preformed spaced depressions in the underside of the hoof into which extend fasteners attached to the shoe.

In International Patent Publication No. WO 94/12024 a protective covering for a horse's hoof is described which comprises a horseshoe made of polyurethane having convex and concave edges and a polymeric fabric, for example a woven polyurethane fabric, bonded to the horseshoe. The shoe is fitted to the horse's hoof and secured thereto using an acrylic structural adhesive both between the hoof and the shoe and between the polymeric fabric and the outside of the horse's hoof.

A horseshoe with a core of metal which is surrounded by a plastic or rubber material and has apertures for intended for nails is suggested in International Patent Publication No. WO 94/22296.

In International Patent Publication No. WO 95/22252 there is proposed a method of shoeing a horse in which a particulate compound comprising a ground up polymer and an adhesive compound. This particulate compound is poured into a mould into which the horse's hoof, which has previously been cleaned and had an adhesive applied to all voids, is lowered.

International Patent Publication No. WO 96/01044 is concerned with a horseshoe having holes for horseshoe nails and including a resilient material.

Another proposal is to be found in International Patent Publication No. WO 98/24312. This comprises a core of metal with holes for horseshoe nails which is substantially entirely enclosed in a substantially deformable material such as a rubber or rubber-like material.

A hoof protector for hooves of horses is suggested in International Patent Publication No. WO 99/40782 which has a horseshoe shaped base body of plastic and at least one fixed front setting element.

International Patent Publication No. WO 99/65298 describes a shock-absorbing horseshoe which is secured to a horse's hoof with nails whose nail heads abut against an intermediate resilient layer.

European Patent Specification No. 0 651 943 A1 teaches a boot for horses' hooves made of flexible material.

A plastic covering for a horse's hoof with a two part laminate construction for attachment to the hoof of a horse using nails is disclosed in European Patent Specification No. 0 823 209 A2. The upper layer comprises a stable plastic material, such as a thermally formable plastic (e.g. polyurethane, polyamide or an elastomer), while the lower layer is less hard and is also formed from a plastic.

European Patent Specification No. 0 832 560 A1 teaches a horseshoe which is at least partially enclosed in a resilient material which has holes for conventional nails.

European Patent Specification No. 0 860 115 A1 discloses a horseshoe with a shock-absorbing sole plate with a peripheral indentation for receipt of a steel band to which are fixed six supports through which nails can be driven into the horse's hoof.

As pointed out above most, if not all, plastics horseshoes currently on the market suffer from the disadvantage that they are time-consuming and cumbersome to apply, particularly those that have to be assembled from a kit of parts. This is at least in part due to the necessity to make the horseshoe fit a damaged foot from which a considerable amount of hoof may have been cut away. Since the horse is lame it will usually be inconvenient or impractical for it to be brought to the smithy so that the farrier has to take his equipment to the horse's own stable. This tends to make it more inconvenient for the farrier to have to reshape a horseshoe away from his own smithy.

There is accordingly a need in the art for an improved form of horseshoe which can be used in therapy for treatment of such diseases as laminitis and which is simple to apply to the foot of a horse being treated. There is a further need for a novel design of horseshoe which can be readily adapted to fit and provide support for a foot of a hoofed animal from which a variable amount of hoof material, and possibly also other tissue, may have been cut or abraded away. There is still further a need for a horseshoe which can be readily formed to an appropriate shape for treatment of a horse that is suffering from foot problems, particularly when such shaping has to be accomplished in the horse's own stable or stableyard rather than at a farrier's smithy. Additionally there is a need for a horseshoe which can be fitted to the hoof of a horse suffering from laminitis or other condition causing lameness without the use of nails and in a manner which substantially avoids trauma for the horse. Yet again there is a need for an improved method of shoeing a horse that obviates the need to drive nails into the hoof of the horse. There is also a need for a method of shoeing a horse suffering from a debilitating condition, such as laminitis, which avoids trauma for the horse. Moreover there is a need to provide a novel method of shoeing a horse which avoids the use of a forge. Another need is for a method of shoeing a horse which utilises horseshoes which can be moulded to a hoof and attached thereto in a simple manner without use of a forge.

SUMMARY OF THE INVENTION

The present invention accordingly seeks to provide an improved form of horseshoe which is suitable for use in treatment of laminitis and other conditions for which horse's feet may require treatment and which is simple to apply to the foot of a horse being treated. It further seeks to provide a new form of horseshoe which can be readily shaped or otherwise adapted to fit and provide support for a foot of a hoofed animal from which hoof material, and possibly also other tissue, has been cut or abraded away. In addition it seeks to provide a horseshoe which can be readily formed to an appropriate shape for treatment of a horse that is suffering from laminitis or other foot problems. It seeks moreover to provide a horseshoe which can be formed quickly and simply to an appropriate shape even under the unfavourable conditions which may exist in a horse's own stable or stableyard, rather than in the convenient surroundings of the farrier's own smithy. It also seeks to provide a plastics horseshoe that is more easily fitted to the hoof, with an improved fitting quality and the additional support required for therapeutic purposes. Additionally it seeks to provide a horseshoe which can be fitted to a horse's hoof without nailing and in a manner which minimises any trauma for the animal. An additional objective of the invention is to provide a novel and improved method of shoeing a hoofed animal, such as a horse, without use of nails driven through the shoes into the animal's hoof. A still further objective is to provide a novel and improved method of shoeing a horse without causing trauma to a horse which may be suffering from a debilitating and painful condition, such as laminitis. Yet another objective is to provide such a method which avoids use of a forge. There is also the objective of providing a novel and improved method of shoeing a horse which utilises horseshoes which can be moulded to the hoof of a horse and attached thereto without requiring use of a temperature high enough to require use of a forge.

According to one aspect of the present invention there is provided a shoe for a hoofed animal comprising a body made from a thermoplastic composition which comprises a matrix of a thermoplastic material which has a softening point of less than 100° C.

The invention further provides a method of shoeing a hoofed animal which comprises:
(a) providing a shoe for a hoof of the animal, the shoe comprising a body which is made from a thermoplastic composition which comprises a matrix of a thermoplastic material having a softening point of less than 100° C. and which has a lower ground-contacting surface for contact, in use, with the ground and an upper foot-contacting surface spaced from the lower ground-contacting surface for contacting, in use, the underside of a foot of a hoofed animal, the body having around at least a part of its upper foot-contacting surface an upstanding peripheral flange portion, and the shoe being adapted to be fitted, in use, on an underside of the hoof with the flange portion extending upwards from a ground border of the hoof adjacent a lower portion of an outer horny wall of the hoof;
(b) forming a plurality of indentations in the lower portion of the outer horny wall of the hoof;
(c) heating the shoe to a temperature sufficient to soften the thermoplastic material but below its melting point;
(d) placing the heated shoe against the underside of the hoof with its flange portion adjacent the lower portion of the outer horny wall of the hoof; and
(e) pressing the flange portion of the heated shoe into contact with the outer horny wall of the hoof so as to cause material of the flange portion to enter each of the plurality of indentations, whereby following cooling of the shoe the shoe is retained on the hoof.

The thermoplastic material is desirably chosen so that the thermoplastic composition is hard at ambient temperatures and at hoof sole temperatures but is softenable by immersion in hot water, preferably boiling water or near boiling water. In addition it should desirably possess at least moderate abrasion resistance. The thermoplastics material preferably has a melting point or a melting point range of less than 100° C. Even more preferably it has a freezing point of at least about 30° C., preferably at least about 35° C., and a melting point or melting point range of less than about 95° C., more preferably less than about 90° C., and even more preferably less than about 75° C. One particularly preferred material is a polycaprolactone. Polycaprolactones are commercially available under the trade marks CAPA® from Solvay Interox Limited, Baronet Road, Warrington, Cheshire WA4 6HB, United Kingdom and TONE® from Union Carbide Corporation of 39 Old Ridgebury Road, Danbury, Conn. 06817-0001, United States of America. The materials sold under the trade mark CAPA® are sold in granule form and are described as polyesters of ε-caprolactone and butane-1, 4-diol. A particular advantage of the use of a polycaprolactone is that it is fully biodegradable. One suitable material is a polycaprolactone having a freezing point of about 35° C., and a melting point range of from about 58° C. to about 60° C. Such a material has a molecular weight of from about 48,000 Daltons to about 52,000 Daltons and is sold under the trade designation CAPA® 650 polycaprolactone. It is also possible to blend CAPA® 650 polycaprolactone with minor amounts, for example up to about 25% by weight or more, e.g. up to about 40% by weight, of another polycaprolactone such as CAPA® 680 polycaprolactone and/or with lesser amounts, for example up to about 10% by weight, of CAPA® 640 polycaprolactone. CAPA® 680 polycaprolactone is reported to have a melting point of about 60 to 62° C. and a molecular weight of about 80,000 Daltons, while CAPA® 640 polycaprolactone is reported to have a melting point of from 58 to 60° C. and a molecular weight of about 37,000 Daltons. A particularly preferred thermoplastic material comprises a mixture of about 2 parts by weight of CAPA® 650 polycaprolactone and about 1 part by weight of CAPA® 680 polycaprolactone.

A preferred form of shoe according to the invention comprises a body moulded from a thermoplastic composition which comprises a matrix of a thermoplastic material having a freezing point of at least about 30° C. and a melting point or melting point range of less than about 95° C., the body having a lower ground-contacting surface for contact, in use, with the ground and an upper foot-contacting surface spaced from the lower ground-contacting surface for contacting, in use, the underside of a foot of a hoofed animal, such as a horse, the body having around at least a part of its upper foot-contacting surface an upstanding peripheral flange portion adapted in use to abut against at least a part of the outer wall of the foot of a horse or other hoofed animal. In such a shoe intended for use on a horse, the body may comprise an arcuate bar portion shaped to underlie the hoof. In addition the two ends of the bar portion may be joined one to another by a crosspiece. Moreover the shoe may include a frogpiece intended to underlie the frog of the horse's foot and which may be provided with a cut out portion that extends from the rearward end of the frogpiece part way towards the front end of the frogpiece so as to facilitate flexing of the shoe. If desired, the flange portion may include an upstanding rear flange portion adapted to abut against the heels of the hoof. Such a shoe can be moulded as a one piece moulding. It can have a chamfered portion on its underside at its front end which underlies the toe of the horse's hoof, in use. Otherwise the under surface of the shoe may be substantially planar.

The flange portion may be continuous or discontinuous. It may be adapted so as to extend, in use, from one side wall around the toe of the horse's hoof to the other side wall. Alternatively the flange portion may be adapted to extend, in use, from the toe of the horse's hoof back towards each of the heels thereof a distance which is less than the overall peripheral distance from the toe to the heel. Instead of a continuous flange portion it is possible to utilise a plurality of tab portions or to use a flange portion whose height varies along its length, such as a crenellated flange portion.

The flange portion may taper in section from its root towards its upper free rim portion. Thus, for example, it may taper in section from a thickness of about 5 mm at its root to about 3 mm at its upper free rim. Typically the body is about 10 mm deep and the flange portion extends upwards for about 20 mm, making the overall height of the horseshoe about 30 mm. It can be made in a variety of sizes. For example, it may measure about 125 mm from front to back and about 105 mm across. However, larger sizes, e.g. for carthorses, or smaller sizes, e.g. for use in correction of foal's foot deformities, can be produced in accordance with the teachings of the invention.

In use of a horseshoe of the invention, the farrier typically first removes any hoof and tissue that may be damaged. Then the horse's hoof can be treated by rasping a number of horizontal key-in lines around the bottom 2 to 3 cm or so of the outer wall. The wall of the hoof is then cleaned with acetone or, preferably, surgical spirit, prior to which the farrier should don protective gloves. Latex gloves are suitable. A horseshoe of the appropriate size according to the invention is then selected and the toe can, if necessary, be worked to create a bevelled edge at the front of the shoe, sloping in an upwardly outward direction from the underside, to provide a larger ground bearing surface area and to facilitate clearance of the toe of the hoof over the ground, thereby reducing the risk of the horse jarring its infected foot. This process can alternatively be performed after the horseshoe has been fitted.

The horseshoe is then placed into a non-reactive liquid, e.g. water, which has been raised to a temperature greater than the freezing point of the thermoplastic material and preferably above its softening point or softening point range. Hence the temperature of the water or other liquid is preferably at least about 60° C. and preferably at least about 80° C. In practice it has been found that a bucket filled with boiling or near boiling water will retain sufficient heat to enable fitting of at least one horseshoe to be completed. The thermoplastic material remains in the liquid until it becomes soft and pliable. This is characterised by the flange of the horseshoe turning transparent. The horseshoe is removed from the liquid before the entire mass turns transparent so as to ensure that it retains its form. This usually takes less than 2 minutes, e.g. about 90 seconds, depending upon the size of the shoe, the temperature of the water and the material used.

Alternatively some other means of heating the thermoplastic material can be used, such as a blow torch or hot air blower. However, the use of hot water has the advantage that it reduces the tackiness of the softened horseshoe and hence of it sticking to the farrier's gloves or other objects with which it may come in contact.

When the horseshoe has softened sufficiently to become manually deformable, the horseshoe is then fitted to the horse's foot by pressing the softened shoe firmly onto the hoof thereby deforming the upper surface of the horseshoe to fit the horse's foot and by pressing the flange portion against the outer surface of the hoof horn outer wall. It is preferable to apply the softened horseshoe heel end first, using the frog as a datum. Special care should be taken to ensure that the shoe is moulded tightly round the hoof. The flange is arranged such that it is in continuous contact with the wall of the hoof around at least a part of its circumference. The flange may extend towards each heel of the hoof only a part of the overall distance from the toe to the heel of the hoof. In this case the heel is free to flex somewhat in use as the horse moves. Alternatively the flange portion can extend substantially the entire distance from the toe of the hoof to its heel on each side of the hoof. In this case the flange portion can be bonded to the hoof, or what remains of it, around the entire periphery of the hoof from one heel to the other. Moreover it can in this latter case also continue across the rear of the horseshoe so that it extends across the rear of the horse's foot.

Each horseshoe can thus be moulded so as to be custom made to match the unique features of each hoof. In addition, if the farrier wishes to build up the horseshoe at any point it is a simple matter to soften some additional polycaprolactone material and then, after cleaning the hoof if necessary, to press the additional material on the softened shoe in the appropriate place.

When the shoe has been satisfactorily shaped to the horse's hoof a rapid coolant can be applied which causes the thermoplastic to re-solidify. Suitable coolants are sold in aerosol dispensers for use in plumbing. A suitable coolant is available from Poynton Ltd, of 60 High Street, Malmesbury, Wiltshire SN16 9AT under the trade mark IMPRINT™. This product is described by its suppliers as a self-propelling mixture of not more than 10% dimethyl ether and the balance 1,1,1,2-tetrafluoroethylene. Re-solidification of the horseshoe is characterised by the horseshoe becoming opaque again as it hardens.

The shoe can be cemented to the hoof by application of a suitable bonding agent between the flange of the horseshoe and the hoof. Suitable bonding agents include those sold under the trade marks Equithane™ and Bond-N-Flex™. A particularly preferred bonding agent is that available under the trade mark IMPRINT™ from Poynton Ltd, of 60 High Street, Malmesbury, Wiltshire SN16 9AT, which is described as a two-part methacrylate adhesive whose components comprise not more than 55% by weight methyl methacrylate and not more than 8% by weight methacrylic acid. The bonding agent can be applied between the flange portion over its entire length. Hence, in one form of horseshoe, bonding agent can be applied over the entire periphery of the hoof, from heel to heel, such that the bonding agent is lipping the top of the flange. In other designs, however, the flange portion does not extend back as far as the heels so that it is adhered to the hoof, or what remains of it, only over a part of the entire periphery of the hoof. Application of the bonding agent can be achieved by prising the edge of the flange away from the hoof wall and injecting the bonding agent into the cavity.

Alternatively and more usually a bonding agent can be applied to the flange portion of the softened horseshoe and normally also to the hoof horn outer wall against which the flange portion is to abut before the horseshoe is applied to the horse's hoof.

It is an advantage of the IMPRINT™ bonding agent that it can be applied to the softened horseshoe immediately after it has been taken out of hot water, even though it is still wet.

It will usually be advantageous to warm the bonding agent somewhat prior to application so as to speed up curing thereof. The horizontal key-in lines rasped into the wall of the hoof improve the grip of the bonding agent on the wall. Attaching the horseshoe to the hoof in this way prevents the damage caused by nailing the shoe in place.

Any final adjustments can then be made to ensure a comfortable fit for the horse.

It is to be understood that the present invention is not restricted to shoes for horses but includes shoes for any hoofed animal. Hence the teachings of the invention can be applied with equal success to shoes for such hoofed animals as donkeys, mules, zebras, and cows.

The thermoplastic composition may further comprise a minor amount (e.g. from about 1% by volume up to about 25% by volume) of a filler material, such as a dye or a rubber in crumb, chunk, or granule form.

If desired, the underside of the shoe can be provided with one or more rubber inserts therein.

BRIEF DESCRIPTION OF THE DRAWINGS

In order that the invention may be clearly understood and readily carried into effect some preferred embodiments thereof will now be described, by way of example only, with reference to the accompanying drawings, in which:

FIG. 1 is a bottom view of a horseshoe according to the invention;

FIG. 2 is a longitudinal side view of the horseshoe of FIG. 1;

FIG. 3 is a rear view of the horseshoe of FIGS. 1 and 2;

DETAILED DESCRIPTION OF THE PREFERRED EMBODIMENTS

Figure 4:
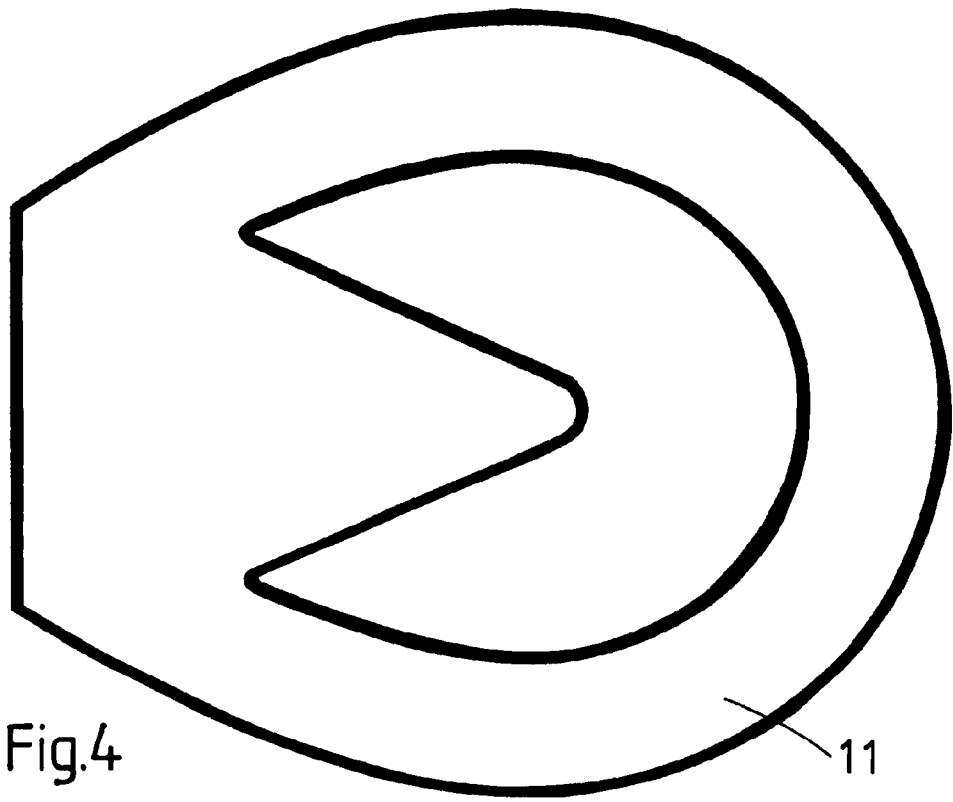
FIG. 4 is a bottom view of a larger horseshoe than that of FIGS. 1 to 3 according to the invention.

Referring to FIGS. 1 to 3 of the drawings, a horseshoe 1 of the heartbar type is moulded in one piece from CAPA® 650 polycaprolactone, which is available from Solvay Interox Limited, Baronet Road, Warrington, Cheshire WA4 6HB, United Kingdom. It can be made from the polycaprolactone by any suitable technique. As examples of moulding techniques there can be mentioned casting and injection moulding. It is also possible to heat polycaprolactone granules in a vessel containing water until the granules coalesce to form a gel, to mould the resulting gel with the fingers into a sausage-like shape, to place the sausage-like shape in a female part of a mould, and then to close the mould with a male member and apply a weight to the male member to cause the material of the sausage-like shape to conform to the shape of the mould cavity. The length of horseshoe 1 is about 125 mm and its breadth is about 105 mm.

The horseshoe 1 comprises a body 2 having a lower ground-contacting surface 3 and an upper foot-contacting surface 4 spaced from the lower ground-contacting surface. Around at least a part of the upper foot-contacting surface 4 of the body 2 there is an upstanding peripheral flange portion 5 which is adapted in use to abut against at least a part of the outer wall of the foot of a horse (not shown). Horseshoe 1 is generally substantially part oval and approximately conforms to the periphery of the hoof. The flange portion 5 protects the lower part of the hoof and provides a means of attaching the horseshoe 1 to the hoof other than by nailing.

As can be seen from FIG. 1, horseshoe 1 comprises an arcuate bar portion 6 shaped to underlie the hoof. Moreover the two ends of the bar portion 6 are joined one to another at the rear of the horseshoe 1 by a crosspiece 7. Crosspiece 7 further carries a frogpiece 8 intended to underlie the frog of the horse's foot. The rear ends of flange portion 5 are joined by an upstanding rear flange portion 9 which is formed on the upper side of the crosspiece 7 and which is intended to abut against the heels of the hoof. Rear flange portion 9 is lower than flange portion 5. A chamfered portion 10 is formed on its underside at its front end so as to underlie the toe of the horse's hoof, in use. The flange portion 5 extends, in use, from a heel of one side wall of the hoof around the toe of the hoof to a heel of the other side wall.

Body 2 is approximately 10 mm thick and the height of the flange portion 5 above upper surface 4 is approximately 20 mm, making the overall height of the horseshoe approximately 30 mm. Flange portion 5 tapers in section from its root, where its thickness is about 5 mm, to approximately 3 mm at its upper rim. It is, however, to be understood that these are only approximate dimensions and the invention allows for substantial variations to fit a wide range of horses' hooves.

As already mentioned, the toe of the shoe is provided with a bevelled portion 10 which slopes upwardly from the undersurface 3.

In use of the horseshoe of FIGS. 1 to 3 for treatment of a horse suffering from laminitis or some other condition adversely affecting the horse's foot, the farrier prepares the horse's hoof prior to fitting, in so doing trimming away any hoof material, and possibly also other tissue, that has been affected by the hoof condition. The edge of the ground bearing surface, i.e. the undersurface, of the hoof is bevelled and a number of horizontal key-in lines are rasped into the bottom 2 cm to 3 cm or so of the hoof. The horizontal lines are used to increase the purchase of the bonding agent which is subsequently used to secure the horseshoe 1 on the hoof, which is otherwise relatively smooth. The toe of the shoe 1 is then, if necessary, further bevelled as required and the hoof is cleaned with acetone or surgical spirit. For the purposes of heating the horseshoe 1 the preferred method is to submerge the shoe in boiling, or close to boiling, water until the thermoplastic material becomes sufficiently pliable for application to the hoof, which is indicated by the flange portion 5 turning from opaque to transparent. This typically takes between about 30 seconds and about 2 minutes for horseshoes made out of CAPA® 650 polycaprolactone, depending upon the size of the shoe 1 and the temperature of the water. However, the horseshoe 1 should not be left in the hot water until it becomes wholly clear in appearance since it will then lose its form entirely.

When the horseshoe 1 is ready to be fitted, it is removed from the water and applied to the hoof. The preferred method of application of the horseshoe 1 to the hoof is to fit the heel first, using the frog as a datum, and forming the softened horseshoe 1 into the contours of the hoof. Particular attention should be paid to shaping the flange portion 5 around the hoof to ensure that it is in contact with the hoof around its full periphery. Attention should also be given to the shaping of the rear flange portion 9 to ensure that it conforms to the shape of the heel. This produces a custom horseshoe for the particular hoof to which it is fitted. The horseshoe 1 is then rapidly cooled to set the thermoplastic material again. This can be achieved by using an aerosol coolant which is sprayed onto the horseshoe 1. To avoid startling the horse by the noise made by the coolant escaping from the aerosol can the farrier can talk, whistle or croon to the horse. Alternatively a pad of foamed plastics material can be placed around the hoof and the coolant sprayed directly into the foam which deadens the sound made by the escaping coolant. The horseshoe 1 turns opaque again when hard.

A bonding agent can then be applied to cement the horseshoe 1 to the hoof. Preferred bonding agents include those sold under the trade marks Equithane™ and Bond-N-Flex™ or IMPRINT™. Preferably the bonding agent is preheated in hot water before being injected between the flange portion 5 and the hoof. A pointed instrument can be used as necessary to prise a gap between the flange portion 5 and hoof so as to allow the bonding agent to flow between them. The bonding agent is injected around the entire periphery of the hoof. Sufficient of the bonding agent is used such that it fills the cavity between flange portion 5 and the hoof to the top of flange portion 5. The bonding agent usually sets within 10 minutes. After the bonding agent has set, final adjustments can be made to the horseshoe 1 to ensure a comfortable fit for the horse.

If desired, tungsten studs or other non-slip grip-enhancing devices can be inserted in the horseshoe. This can be done by heating a sharp tool in hot water and pushing its point carefully into the underside of the horseshoe 1 after it has been fitted to the horse and then inserting a tungsten stud into the resulting blind hole whilst its walls are still soft and spraying on a coolant to re-freeze the polycaprolactone material.

Another way to impart non-slip properties to the horseshoe of the invention is to incorporate at least one rubber insert in the under surface of the horseshoe. Such an insert may take the form of a rubber strip, a rubber chunk, or rubber crumbs or granules. More than one rubber insert can be provided, particularly if rubber chunks, crumbs or granules are used. The at least one rubber insert is positioned in the horseshoe so as to form part of the ground-contacting surface of the horseshoe. If a strip of vulcanised rubber is used, then its dimensions are preferably chosen such that its length is less than the arcuate distance measured around the horseshoe from one heel thereof to the other, and is preferably no more than about 80% of this arcuate distance, such that its width is less than the width of the arcuate portion of the horseshoe, and is preferably no more than about 60% of such width, and such that its thickness is not more than about 60% of the overall thickness of that part of the horseshoe that is adapted in use to underlie the hoof of the horse. Moreover it is preferred that the strip is trapezoidal in section with the longer of the two parallel sides of the trapezium being disposed uppermost in the horseshoe. The difference in length between the two parallel sides of the trapezium need be no more than about 2 mm, and is preferably no more than about 1 mm to about 1.5 mm. A suitable strip is about 8 mm wide on its underside and about 6 mm thick and of appropriate length to suit the size of the horseshoe. If such a rubber strip is placed in the mould prior to casting of the polycaprolactone material or other thermoplastic material, then it becomes permanently embedded in the horseshoe and is retained therein by reason of its shape. Preferably the rubber strip is shaped so as to be arcuate in plan, although it can be a straight strip appropriately bent to shape. To facilitate correct placement of the rubber strip, an arcuate groove can be formed in the bottom of the mould. The use of such a groove in the bottom of the mould will further ensure that the underside of the rubber strip projects below the polycaprolactone mass from which the major part of the horseshoe is formed. Suitably the rubber strip projects about 2 mm below the underside of the horseshoe. As suitable rubbers there can be mentioned any non-slip abrasion resistant rubber material, for example any of those natural or synthetic rubbers which are conventionally used for the manufacture of motor vehicle tyres or of rubber soles or heels for men's or ladies' shoes. Besides imparting non-slip properties to the horseshoe the rubber insert may perform other functions, for example as a surface upon which to display a trade mark. For this purpose the rubber insert may have, for example, a triangular shape which is positioned to underlie a frog part of the horseshoe and to display a trade mark such as IMPRINT™. In order to ensure retention of a triangular or other shape of insert in the finished horseshoe, it is preferred that the dimensions of the upper side of the insert are at least slightly larger than those of the underside thereof, for example about 1 mm to about 2 mm larger. When chunks, crumbs or granules of rubber are used these can be scattered on the bottom of the mould before casting of the polycaprolactone material or other thermoplastic material takes place. The chunks, crumbs or granules of rubber in this case should have a maximum dimension of no more than about 5 mm, and preferably no more than about 2 mm or 3 mm. After casting of the polycaprolactone material, the rubber chunks, crumbs or granules form at least a part of the under surface of the horseshoe and, provided that sufficient rubber chunks, crumbs or granules have been used, impart non-slip properties thereto after casting of the polycaprolactone material or other thermoplastic material has occurred.

The farrier may decide during the preliminary work on the horse's hoof and before the bonding agent is applied that the fit of the horseshoe needs to be improved, for example to provide support where hoof and/or tissue has ben removed. In this case he can clean the horseshoe and then can build up the upper surface of the shoe by softening some additional polycaprolactone, possibly having also reheated the horseshoe, and moulding the additional polycaprolactone in place to provide the correct support for the horse's foot. This can be achieved very quickly.

In a modification of the horseshoe of FIGS. 1 to 3, the flange portion 5 is arranged to extend part of the way only, for example from about one half to two thirds of the way only, from the toe to the heel along each side of the horseshoe. Upon bonding such a horseshoe to a horse's hoof, the result is that the heels of the hoof can still flex with respect to the rest of the horse's foot.

It will be appreciated by those skilled in the art that the use of a horseshoe in accordance with the invention radically alters the traditional methods of farriery in that the farrier can use a bucket of hot water to soften a plastics material to shape the horseshoe in the way that the treatment of the horse requires instead of having to use the traditional forge and anvil or having to trim or assemble a plastics horseshoe from a kit of parts. Such a new method of shoeing a horse can be carried out easily and quickly wherever the horse happens to be stabled without having to transport the horse to the farrier's smithy. Moreover shoeing can be effected with minimum trauma being caused to the horse.

In place of CAPA® 650 polycaprolactone it is alternatively possible to utilise a mixture of CAPA® 650 polycaprolactone with one or both of CAPA® 680 caprolactone and CAPA® 640 polycaprolactone. Such mixtures include, for example, an 80:20 or an 83:17 mixture by weight of CAPA® 650 and CAPA® 680 polycaprolactones. In some cases it may also be beneficial to admix a small quantity, for example up to about 10% by weight of CAPA® 640 polycaprolactone with CAPA® 650 polycaprolactone or with a CAPA® 650/CAPA® 680 polycaprolactone mixture.

Figure 5:
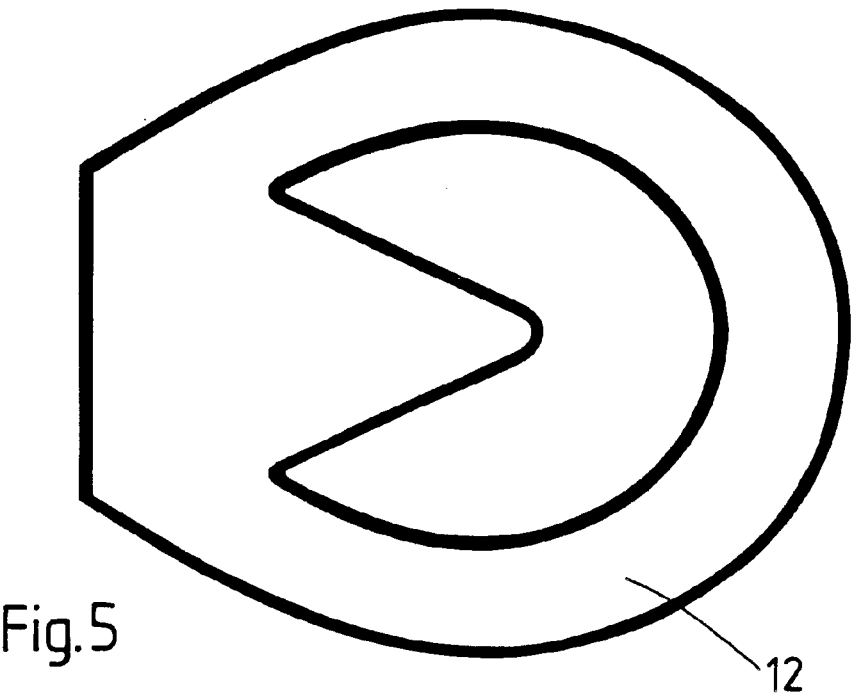
FIG. 5 is a bottom view of a smaller horseshoe than that of FIGS. 1 to 3 according to the invention.

FIGS. 4 and 5 show respectively a larger horseshoe 11 and a smaller horseshoe 12 which are generally similar to the horseshoe 1 of FIGS. 1 to 3.

Figures 6, 7:
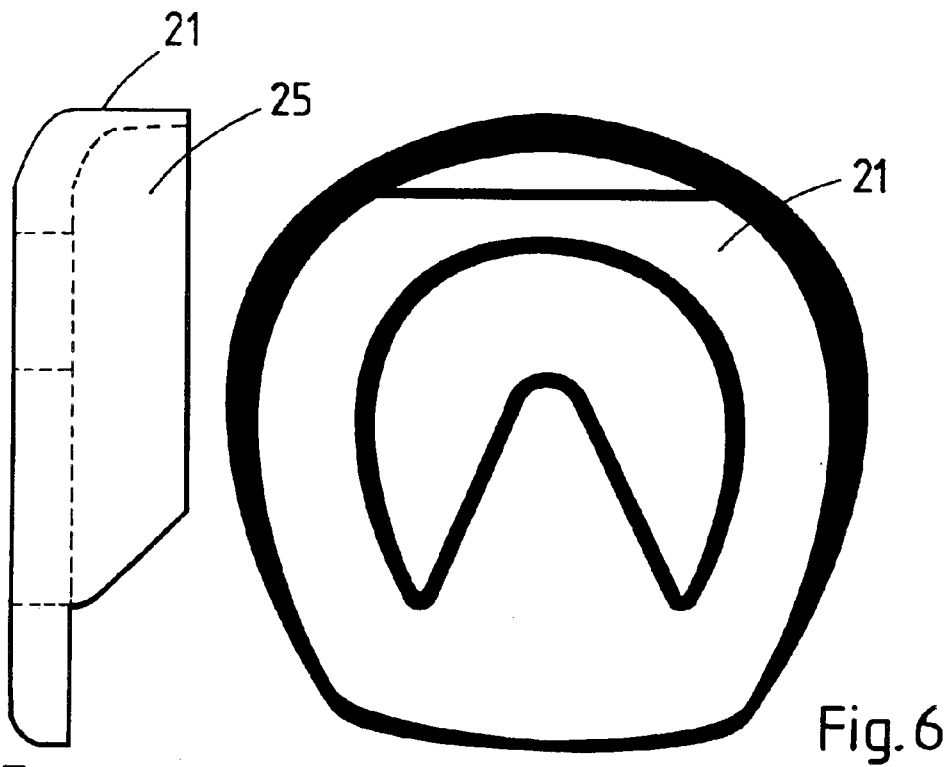
FIG. 6 is a bottom view of a further modified form of horseshoe according to the invention.
FIG. 7 is a side view of the horseshoe of FIG. 6.
Figure 8:
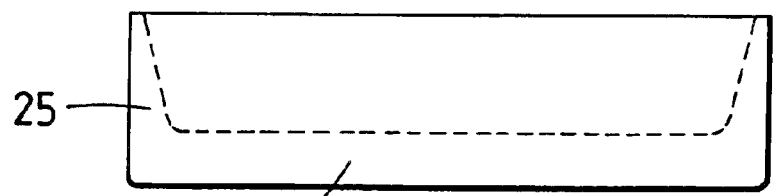
FIG. 8 is a rear view of the horseshoe of FIGS. 6 and 7.

FIGS. 6 to 8 illustrate a modified form of horseshoe 21 which is generally similar to that of FIGS. 1 to 3 but in which the flange portion 25 extends from the front of the horseshoe 21, which will underlie the toe of the horse's hoof, in use, backwards along each side only a part of the overall distance towards the part of the horseshoe which will underlie the respective heel of the horse's hoof in use. In addition there is no flange on horseshoe 21 corresponding to the rear flange portion 9 of the horseshoe 1 of FIGS. 1 to 3 so that the horseshoe 21 is open at the back. When horseshoe 21 is fitted to a horse's foot, using the same general technique as described above, the flange portion 25 enables it to be firmly attached to the toe and front part of the hoof but the design of the horseshoe 21 allows the heels to flex and to move relative to the horseshoe 21.

Although the invention has been illustrated with reference to horseshoes with a crosspiece and a frogpiece, it will be understood by those skilled in the art that many alternative designs of horseshoe incorporating the teachings of the invention can be made. Examples include horseshoes of the so-called egg, egg-heartbar, square toed heartbar, and straightbar types. The invention is also applicable to the production of foal correction boots, as well as to horseshoes with soles, with graduation, or with medial, lateral, anterior or posterior extensions.

FIGS. 9 to 16 illustrate a preferred method in accordance with the invention of shoeing a hoofed animal, such as a horse.

Figure 9:
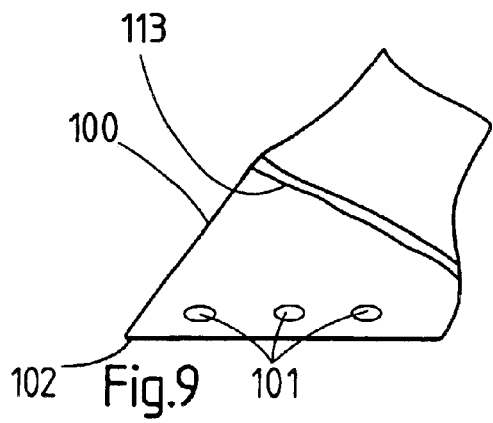
FIG. 9 is a side view of a horse's hoof illustrating a first step in shoeing a horse using the method of the present invention.

FIG. 9 is a side view of a horse's hoof 100 having a number of indentations 101 that have been made by a farrier in the outer horny wall of the hoof 100 in readiness for attachment of a horseshoe in accordance with the invention. Indentations 101 can be formed by any convenient method, for example using a router tool, a knife, such as a loop knife, or a farrier's instrument for removing horn from a horse's hoof. Preferably, however, a router tool is used to make indentations 101. These indentations are made in a lower portion of the hoof which extends from a ground border 102 of the hoof 100 upwards a distance of from about 1 cm to about 2 cm. The shape and size of indentations 101 are discussed further below. Typically the farrier should make from five to ten indentations 101 substantially regularly spaced apart from each other in the lower portion of the hoof horn outer surface, usually from six to eight indentations 101 being an adequate number.

Figure 10:
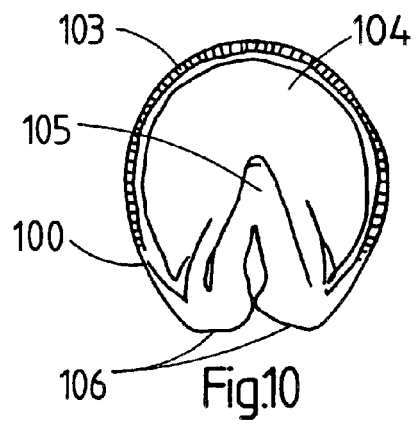
FIG. 10 is a solar view of the hoof of FIG. 9.

After or before forming indentations 101 in hoof 100 the farrier also preferably bevels the lower edge of the horny outer wall, conveniently by use of a rasp or file, so as to provide a bevelled edge 103 around the front part of the ground border 102 of hoof 100. Also visible in FIG. 10 are the sole 104, the frog 105 and the heels 106 of hoof 100.

Figure 11:
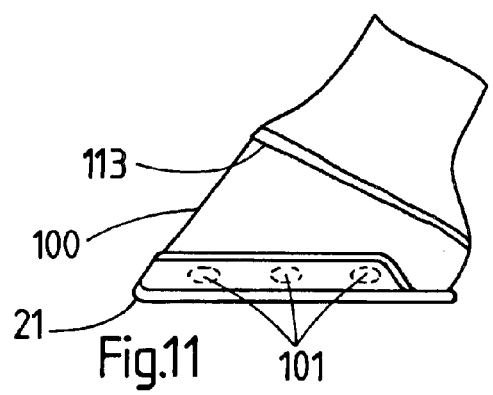
FIG. 11 is a further side view of the hoof of FIGS. 9 and 10 showing a later stage in the method of the invention with a horseshoe according to the invention in place on the horse's hoof.

FIG. 11 illustrates the hoof 100 after the next stage of the process of the invention, namely fitting of a horseshoe 21 (see FIGS. 6 to 8). During this step and the succeeding steps the farrier is advised to wear latex gloves.

Before fitting of the horseshoe 21 to the hoof 100, the farrier should first clean the outer wall of the hoof 100 with a solvent for grease, such as surgical spirit or acetone. As described above, the horseshoe 21 is first softened by immersion in hot water in the temperature range of from about 65° C. to about 100° C., preferably near boiling, i.e. at least about 90° C., until its flange portion 25 becomes transparent. (The horseshoe 21 should not be left in the hot water until it becomes completely transparent or it will lose all of its form). The horseshoe 21 should then be removed carefully from the water and any excess water allowed to drain off. A bead of IMPRINT™ bonding agent can then be applied to the inside of the flange portion 25, even though it is still wet; a further bead of IMPRINT™ bonding agent is preferably also applied around a corresponding portion of the outer surface of the hoof horn outer wall. While its flange portion 25 is still pliable the horseshoe 21 is then applied to the underside of the hoof 100. In so doing the farrier should fit the horseshoe 21 first at the heels 106 end of the hoof 100, using the frog 105 as a datum, and then press the shoe 21 onto the hoof 100 so as to help conform the upper face of horseshoe 21 to the shape of the underside of hoof 100. While the flange portion 25 remains manually mouldable, the farrier should then mould this to the outer surface of the hoof horn outer wall. In this moulding operation the farrier should apply pressure with his fingers to the outer surface of the flange portion 25 in the region of each of the indentations 101 so as to press material of the flange portion 25 into each of the indentations 101. During this moulding operation care should be taken not to cause over-thinning of any significant part of the flange portion 25.

Figure 12:
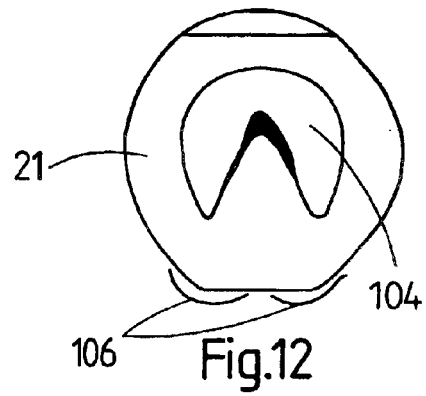
FIG. 12 is a solar view of the hoof of FIG. 11 with its attached shoe.

FIG. 12 shows the underside of hoof 100 with the horseshoe 21 applied thereto. Reference numeral 104 indicates the sole of the hoof 100.

Figure 13:
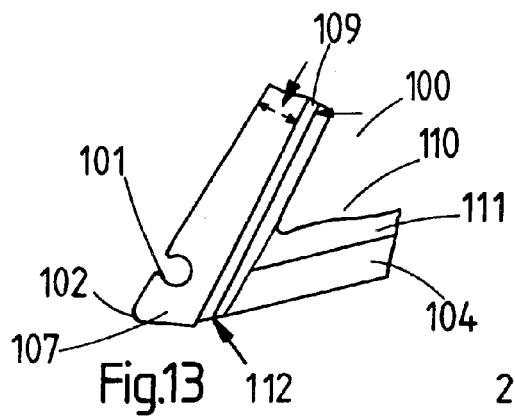
FIG. 13 is a sagittal section through the hoof of FIGS. 9 and 10.

In FIG. 13 there is shown a sagittal section through hoof 100 after formation of an indentation 101 and before application of a horseshoe 21. As can be seen from FIG. 13 indentation 101 has a bulb-like section. Conveniently it is formed using a router tool in the hoof horn outer wall 107. Its depth is preferably from about 1 mm up to about 80% of the thickness of the hoof horn outer wall 107, while its maximum transverse dimension at the surface of the hoof horn outer wall 107 is typically from about 2 mm up to about 10 mm.

Figure 14:
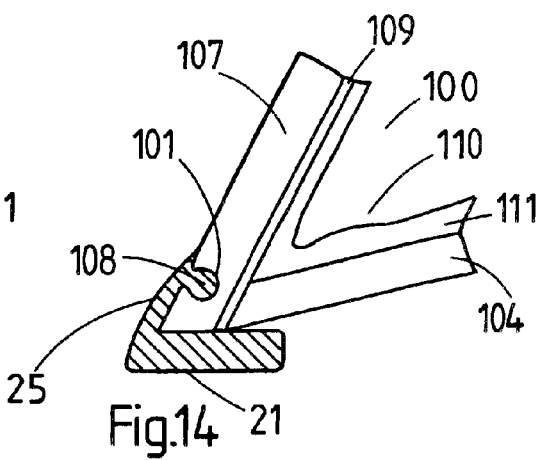
FIG. 14 is a similar sagittal section through the hoof of FIGS. 11 and 12.

FIG. 14 is a similar sagittal view of hoof 100 after moulding of the flange portion 25 to the hoof horn outer wall 107 and shows how some of the material of the flange portion 25 has been pressed into the indentation 101, as indicated by reference numeral 108.

In FIGS. 13 and 14 there are also shown the laminae 109, the bone 110, the corium 111, and the white line 112.

Once the farrier is satisfied with the moulding operation and with the resulting shoe balance, re-hardening of the material of the horseshoe 21 can be accelerated by use of a refrigerant spray directed on the horseshoe 21 from an aerosol spray can. Upon such re-hardening the horseshoe 21 again becomes opaque and the hoof 100 can be placed on the ground again. There is now union between the hoof 100 and horseshoe 21, with the latter being attached firmly to the hoof 100 without movement.

In order to further improve this union, a bonding agent, such as a two part adhesive, for example, a urethane polymer adhesive, can be applied from a twin cartridge pack fitted with a mixer nozzle for the two components. Preferably the pack is preheated by immersion in hot water so as to accelerate subsequent cure thereof. As already mentioned, the bonding agent can be applied to the flange portion 25 while it is still softened. Alternatively, but less preferably, the bonding agent can be applied along the length of the upper edge of the flange portion 25 and lipping the join between the flange portion 25 and the hoof horn outer wall. A pointed instrument can be used during this operation in order to ply the upper edge of flange portion 25 away from the hoof horn outer wall. Once the farrier is satisfied that the bonding agent has been uniformly applied all along the upper edge of flange portion 25, a spatula can be used to smooth the surface of the resulting joint. The horse should then be encouraged to stand as still as possible until the bonding agent has hardened, normally about 10 to about 15 minutes. Complete hardening of the bonding agent will typically take approximately an hour.

If during the course of the fitting of the horseshoe 21 to hoof 100 the farrier should want to remould the already hardened flange portion 25, this can readily be achieved by directing hot air from a hot air gun against the appropriate part of the outer surface of flange portion 25. During such a procedure the hot air gun should be pointing downward and away from the limb. To avoid misdirecting the hot air onto any part of the horse's leg other than the hoof, it is advisable for the farrier to place his hand around the coronary border 113 of hoof 100. Having re-softened the flange portion 25 in this way, the farrier can soften first the flange portion 25 along one side of hoof 100 and peel it away from the hoof horn outer wall, before treating the flange portion 25 along the other side of the hoof in a similar way. The flange portion 25 can then be re-moulded to the hoof 100.

Figure 15:
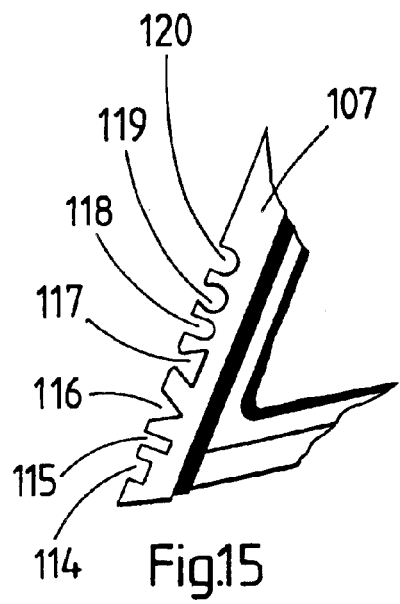
FIG. 15 illustrates diagrammatically sagittal sections through a horse's hoof showing various possible types of indentation.
Figure 16:
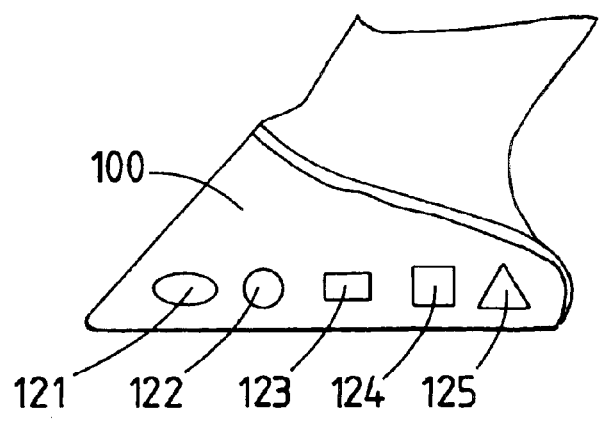
FIG. 16 is a side view of a horse's hoof showing diagrammatically various possible shapes of indentation.

The indentations 101 in FIGS. 9 and 11 are substantially elliptical in plan and are, as shown in FIGS. 13 and 14, bulb-shaped in section. FIGS. 15 and 16 illustrate alternative shapes for indentations, in plan and in section respectively. It should, however, be noted that only the lowermost indentation in FIG. 15 lies on the lower portion of the hoof horn outer surface. The other forms of indentation are shown at high locations than would be used in actual practice, solely for convenience and to avoid proliferation of Figures. Hence any of the forms of indentation illustrated would, in practice, be positioned at a height above the ground border 102 similar to that indicated for indentations 101 in FIGS. 9 and 11. Indentation 114 has a rectangular section, indentation 115 has a square one, indentation 116 has a V section, indentation 117 has a triangulation section, indentation 118 a U-shaped section, indentation 119 a bulb section (like the section of indentation 101 of FIG. 13) section, and indentation 120 has a semi-circular section.

In FIG. 16 indentation 121 has an elliptical or oval configuration in plan, indentation 122 has a round one, indentation 123 has a rectangular configuration, indentation 124 has a square one, and indentation 125 has a triangular configuration in plan.

It will be appreciated by those skilled in farriery that the method described in relation to FIGS. 9 to 16 is an improvement upon shoeing a horse with a tender or diseased hoof with a conventional metal shoe since it involves no nailing and requires the use of low temperatures only. Thus the farrier does not need to apply a hot shoe to a tender hoof with a resulting lack of trauma for the horse. Since the shoe is applied to the hoof in softened form, it can be moulded in situ to a certain extent to fit the particular hoof to which it is being applied, thereby ensuring a more comfortable fit for the horse. Moreover because no hammering is required there is a greatly reduced risk of causing pain to a lame horse. The procedure for heating and fitting a shoe in accordance with the invention is quick and so the time for which the animal has to stand on three legs only is reduced. This can be a very relevant consideration when the horse is lame.

It will be appreciated by skilled farriers that the horseshoes of the invention have advantages over conventional metal horseshoes even for shoeing horses that have healthy hooves and that are not lame. Thus their lightness compared to metal horseshoes can be advantageous when shoeing racehorses.

Figure 17:
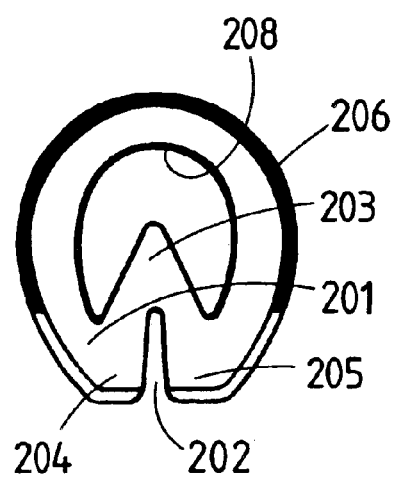
FIG. 17 is a top plan view of a further form of horseshoe constructed in accordance with the invention.
Figure 18:
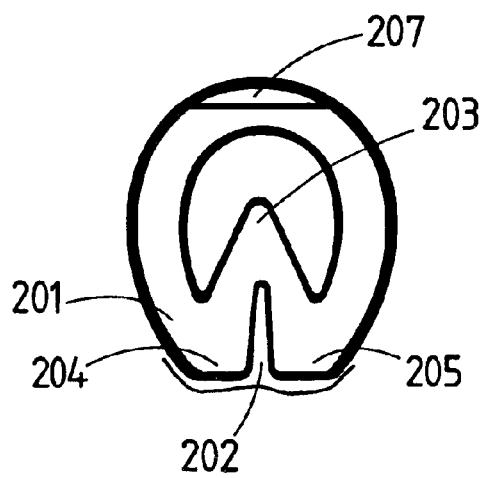
FIG. 18 is a bottom plan view of the horseshoe of FIG. 17.

FIGS. 17 and 18 illustrate a further form of horseshoe 201 which is generally similar to shoe 21 of FIGS. 6 to 8 except that a cut out portion 202 is formed in the frogpiece 203. This cut out portion imparts a certain degree of flexibility to horseshoe 201 and allows limited relative vertical movement of the heels 204 and 205. Reference numeral 206 indicates the flange portion around the toe of the horseshoe 201, which is similar to flange 25 of horseshoe 21 of FIGS. 6 to 8, while reference numeral 207 indicates a chamfered portion at the toe end of the horseshoe 201.

If desired, a minor chamfered surface can also be provided on the upper face of horseshoe 201 adjacent the inner arcuate edge 208. This chamfered surface can make an angle of about 15° with the remainder of the upper surface of the horseshoe 201 within the flange portion 206. A similar minor chamfered surface can be provided, if desired, on any of the other illustrated embodiments of the invention.

What is claimed is:

1. A shoe for a horse comprising a body made from a thermoplastic composition which comprises a matrix of a thermoplastic material which has a softening point of less than 100° C., the body having a lower ground-contacting surface for contact, in use, with the ground and an upper foot-contacting surface spaced from the lower ground-contacting surface for contacting, in use, an underside of a foot of a horse, the body having around at least a part of its upper foot-contacting surface an upstanding peripheral flange portion adapted in use to abut against a lower part of a hoof horn wall of the foot of a horse, whereby, upon immersing the shoe in hot water for a period of time sufficient to soften the shoe, the flange portion can thereafter be manually moulded to the outer surface of the hoof horn wall and caused to interlock with previously formed indentations in the hoof horn wall.

2. A shoe according to claim 1, wherein the upstanding peripheral flange portion tapers in section from a root of the flange portion towards an upper free rim portion of the flange portion.

3. A shoe according to claim 2, wherein the thermoplastic material has a freezing point of at least about 30° C. and a melting point or melting point range of less than about 95° C.

4. A shoe according to claim 1, wherein the thermoplastic material is a polycaprolactone having a freezing point of about 35° C., and a melting point range of from about 58° C. to about 60° C.

5. A shoe according to claim 1, wherein the thermoplastic material is a polyester of ε-caprolactone and butane-1,4-diol.

6. A shoe according to claim 5, wherein the thermoplastic material has a freezing point of about 35° C., and a melting point range of from about 58° C. to about 60° C.

7. A shoe according to claim 1, wherein the upstanding peripheral flange portion is from about 10 mm to about 20 mm high.

8. A shoe according to claim 1, wherein the body comprises an arcuate bar portion shaped to underlie the hoof and wherein the bar portion has two ends joined one to another at a rear end of the shoe by a crosspiece.

9. A shoe according to claim 1, wherein the shoe includes a frogpiece intended to underlie a frog of a horse's foot.

10. A shoe according to claim 9, wherein the frogpiece is provided with a cutout portion that extends from a rearward end of the frogpiece part way towards a front end of the frogpiece.

11. A shoe according to claim 1, wherein the flange portion includes an upstanding rear flange portion adapted to abut against heels of the hoof.

12. A shoe according to claim 1, wherein a chamfered portion is formed on an underside of the shoe at its front end so as to underlie a toe of the horse's hoof, in use.

13. A shoe according to claim 1, wherein the hoof has a toe and has a heel on each of a pair of opposite side walls and wherein the flange portion is adapted so as to extend, in use, from a heel of one side wall around the toe of the hoof to the heel of the opposite side wall of the hoof.

14. A shoe according to claim 1, wherein the hoof has a toe and has a heel on each of a pair of opposite side walls and wherein the flange portion is adapted to extend, in use, from the toe of the hoof back towards each of the heels of the hoof a distance which is less than the overall distance between the toe and the respective one of the heels.

15. A shoe according to claim 1, wherein the flange portion tapers in section from a thickness of about 5 mm at its root to about 3 mm at its upper free rim.

16. A shoe according to claim 1, wherein the body is about 10 mm deep and the flange portion extends upwards from the body for about 10 mm, so as to give an overall height to the shoe of about 20 mm.

17. A shoe according to claim 1, wherein the shoe is provided on its lower surface with a plurality of tungsten studs or other non-slip grip-enhancing devices.

18. A shoe according to claim 1, wherein the thermoplastic composition further comprises a filler material.

19. A shoe according to claim 18, wherein the filler material comprises a rubber in crumb form.

20. A shoe according to claim 1, wherein the lower surface of the body is provided with at least one rubber insert.

21. A shoe for fitting to a hoof of a horse comprising a body made from a thermoplastic composition which comprises a matrix of a thermoplastic material which has a softening point of less than 100° C., the body having a lower ground-contacting surface for contact, in use, with the ground and an upper foot-contacting surface spaced from the lower ground-contacting surface for contacting, in use, an underside of a foot of a horse, the body having around at least a part of its upper foot-contacting surface an upstanding peripheral flange portion adapted in use to abut against at least a part of an outer surface of a horny wall of the hoof of a horse and a chamfered portion on an underside of the shoe at its front end so as to underlie a toe of the hoof, in use, and to provide a bevelled edge sloping in an upwardly outward direction from the underside, whereby clearance of the toe of the hoof over the ground is facilitated and whereby, upon immersing the shoe in hot water for a period of time sufficient to soften the shoe, the flange portion can thereafter be manually moulded to the outer surface of the hoof horn wall and caused to interlock with previously formed indentations in the hoof horn wall.

22. A shoe for a hoofed animal comprising a body made from a thermoplastic composition which comprises a matrix of a thermoplastic material which has a softening point of less than 100° C. and further comprises a rubber in crumb form as a filler material, the body having a lower ground-contacting surface for contact, in use, with the ground and an upper foot-contacting surface spaced from the lower ground-contacting surface for contacting, in use, an underside of a foot of a hoofed animal, the body having around at least a part of its upper foot-contacting surface an upstanding peripheral flange portion adapted in use to abut against at least a part of an outer wall of the foot of a hoofed animal.

23. A shoe for a horse comprising a body made from a thermoplastic composition which comprises a matrix of a thermoplastic material which has a softening point of less than 100° C., the body having a lower ground-contacting surface for contact, in use, with the ground and an upper foot-contacting surface spaced from the lower ground-contacting surface for contacting, in use, an underside of a foot of a horse, the body having around at least a part of its upper foot-contacting surface an upstanding peripheral flange portion which is adapted in use to abut against at least a part of an outer wall of the foot of a horse and which tapers in section from a root of the flange portion towards an upper free rim portion of the flange portion.

24. A shoe for a horse comprising a body made from a thermoplastic composition which comprises a matrix of a thermoplastic material which has a softening point of less than 100° C., the body having a lower ground-contacting surface for contact, in use, with the ground and an upper foot-contacting surface spaced from the lower ground-contacting surface for contacting, in use, an underside of a foot of a horse, the body having around at least a part of its upper foot-contacting surface an upstanding peripheral flange portion which is from about 10 mm to about 20 mm high and is adapted in use to abut against at least a part of a hoof horn wall of the foot of a horse, whereby, upon immersing the shoe in hot water for a period of time sufficient to soften the shoe, the flange portion can thereafter be manually moulded to the outer surface of the hoof horn wall.

25. A shoe for a horse comprising a body made from a thermoplastic composition which comprises a matrix of a thermoplastic material which has a softening point of less than 100° C., the body having a lower ground-contacting surface for contact, in use, with the ground and an upper foot-contacting surface spaced from the lower ground-contacting surface for contacting, in use, an underside of a foot of a horse, the body having around at least a part of its upper foot-contacting surface an upstanding peripheral flange portion adapted in use to abut against a lower part only of an outer wall of the foot of a horse.

* * * * *